(12) United States Patent
Kuramoto et al.

(10) Patent No.: US 8,006,473 B2
(45) Date of Patent: Aug. 30, 2011

(54) MOWED GRASS AMOUNT DETECTING APPARATUS FOR GRASS COLLECTION CONTAINER OF GRASS MOWING MACHINE

(75) Inventors: Takashi Kuramoto, Sakai (JP);
Nobuyuki Yamashita, Izumi (JP);
Hironobu Nishihara, Sakai (JP)

(73) Assignee: Kubota Corporation, Osaka (JP)

( * ) Notice: Subject to any disclaimer, the term of this patent is extended or adjusted under 35 U.S.C. 154(b) by 134 days.

(21) Appl. No.: 12/372,968

(22) Filed: Feb. 18, 2009

(65) Prior Publication Data

US 2009/0320433 A1    Dec. 31, 2009

(30) Foreign Application Priority Data

Jun. 26, 2008   (JP) .................................. 2008-167629

(51) Int. Cl.
*A01D 43/063* (2006.01)
(52) U.S. Cl. ...................................... 56/202; 56/10.2 R
(58) Field of Classification Search ............... 56/10.2 R, 56/16.6, 194, 202, 203, 320.2, DIG. 15; 340/612, 340/686, 686.1; 200/47, 61.2, 61.21; 116/303; 73/290 R
See application file for complete search history.

(56) References Cited

U.S. PATENT DOCUMENTS

| | | | | |
|---|---|---|---|---|
| 2,627,244 A * | 2/1953 | Herigstad | ..................... | 116/303 |
| 3,246,313 A * | 4/1966 | Weaklend | ..................... | 340/617 |
| 4,969,320 A * | 11/1990 | Langford | ....................... | 56/16.6 |
| 5,361,568 A * | 11/1994 | Lin | ................................ | 56/194 |
| 5,605,033 A * | 2/1997 | Olmr | ........................... | 56/10.2 R |
| 5,775,077 A * | 7/1998 | Olmr | ................................ | 56/202 |
| 5,950,408 A * | 9/1999 | Schaedler | ........................ | 56/202 |
| 5,960,613 A * | 10/1999 | Mixon et al. | ................ | 56/10.2 R |
| 6,038,843 A * | 3/2000 | Sebben et al. | ................... | 56/202 |
| 6,073,432 A * | 6/2000 | Schaedler | ......................... | 56/202 |
| 6,272,818 B1 | 8/2001 | Sebben et al. | | |
| 6,431,981 B1 * | 8/2002 | Shinners et al. | ................... | 460/6 |
| 6,616,527 B2 * | 9/2003 | Shinners et al. | ................... | 460/6 |
| 6,622,465 B2 * | 9/2003 | Jerome et al. | ................... | 56/203 |
| 2006/0201123 A1 | 9/2006 | Umemoto et al. | | |

FOREIGN PATENT DOCUMENTS

| | | | |
|---|---|---|---|
| EP | 639321 A2 * | 2/1995 | |
| FR | 2707833 A3 * | 1/1995 | |
| JP | 06-153653 | 6/1994 | |
| JP | 11-168941 | 6/1999 | |
| JP | 2008-029286 | 2/2008 | |

* cited by examiner

*Primary Examiner* — Thomas B Will
*Assistant Examiner* — Joan D Misa
(74) *Attorney, Agent, or Firm* — The Webb Law Firm (57) ABSTRACT

A mowed grass amount detecting apparatus for a grass collection container of a grass mowing includes a pivotal sensor plate (62) constituting a portion of a boundary wall for holding the mowed grass charged into the grass collection container. The pivotal sensor plate has a receiving face which receives the weight of mowed grass. The apparatus also includes a detecting unit (66) for detecting an amount of pivotal movement of the sensor plate (62) from a home position. The receiving face of the pivotal sensor plate (62) is configured so as to close a sensor opening portion formed downwardly of a mowed grass charging portion of the grass collection container communicated and connected with the conveying duct, so that the receiving face of the pivotal sensor plate receives the weight of mowed grass held within the grass collection container (32) through the sensor opening portion.

3 Claims, 8 Drawing Sheets

MOWED GRASS AMOUNT DETECTING APPARATUS FOR GRASS COLLECTION CONTAINER OF GRASS MOWING MACHINE

BACKGROUND OF THE INVENTION

1. Field of the Invention

The present invention relates to a mowed grass amount detecting apparatus for detecting an amount of mowed grass in a grass collection container for a grass mowing machine, the grass collection container receiving grass mowed by a mower unit though a conveying duct.

2. Description of the Related Art

A mowed grass amount detecting apparatus for detecting an amount of mowed grass in a grass collection container for a grass mowing machine is known from e.g. JP 6-153653 A (para. [0027]-[0029], FIG. 3).

This mowed grass amount detecting apparatus includes an optical sensor unit consisting of a light emitting portion and a light receiving portion mounted inside a housing which covers the grass collection container, and a fullness detecting unit for detecting fullness of the amount of mowed grass in the grass collection container, based on an output signal from the optical sensor unit. With this conventional art, a bracket for mounting the optical sensor unit and the fullness detecting unit or its support or a signal line extending from the optical sensor unit to the fullness detecting unit can be an obstacle which blocks the flow of mowed grass, thereby causing such problem as entanglement or jamming of the mowed grass. If a curved cover for covering such bracket and/or signal line is provided for reducing such interference, this will reduce the entanglement or jamming of mowed grass, but since the cover protrudes inside the grass collection container, there occurs a new problem of reduction in the capacity of the grass collection container.

SUMMARY OF THE INVENTION

In view of the above-described state of the art the object of the present invention is to provide a mowed grass amount detecting apparatus for a grass collection container, which apparatus does not block the flow of mowed grass and which also does not invite reduction of the capacity of the grass collection container.

For accomplishing the above-noted object a mowed grass amount detecting apparatus according to the present invention, comprises:

a pivotal sensor plate constituting a portion of a boundary wall for holding mowed grass charged into a grass collection container through a conveying duct, the pivotal sensor plate having a receiving face which receives the weight of mowed grass;

a spring disposed in a space on the outer side of the receiving face for urging said sensor plate in a direction toward its home-position;

a detecting unit for detecting an amount of pivotal movement of said sensor plate from said home position;

said receiving face of said pivotal sensor plate being configured so as to close a sensor opening portion formed downwardly of a mowed grass charging portion of said grass collection container communicated and connected with the conveying duct so that said receiving face of the pivotal sensor plate receives the weight of mowed grass held within the grass collection container via mowed grass entering through said sensor opening portion.

With this construction, when mowed grass is charged to and held inside the grass collection container, the mowed grass enters the sensor opening portion to come into contact with the sensor plate, thereby applying its weight to the sensor plate. With this, the sensor plate will be pivoted away from its home position against the spring, due to the weight of the mowed grass and the amount of this pivotal movement of the sensor plate from the home position is detected by the detecting unit. In this, as the sensor opening portion is provided downwardly of the mowed grass charging portion, grass conveying air flow entering the grass collection container from the conveying duct connected to the mowed grass charging portion will not directly collide the receiving face of the sensor plate. Hence, there occurs no interference of the sensor plate by the flow of incoming mowed grass. Further, as the spring for urging the sensor plate in the direction toward the home position is disposed at the space on the outer side of the receiving face of the sensor plate, there occurs no entanglement between the spring and the mowed grass, so that the pivotal movement of the sensor plate can occur smoothly and the mowed grass amount detection can be effected with high precision. Moreover, according to the present invention, unlike the conventional detecting apparatus, there is no constituent member of the mowed grass amount detecting apparatus inside the grass collection container. So, such problems as entanglement jamming or poor scattering of the mowed grass or capacity reduction of the grass collection container can be solved.

According to one preferred embodiment of the present invention, the lateral width of said sensor opening portion is substantially equal to the lateral width of the exit of said conveying duct at the mowed grass charging portion. With this, the weight of the mowed grass charged through the conveying duct and then accumulated can be applied through the sensor opening portion to the receiving face of the sensor plate, whereby the mowed grass amount detection can be effected with each higher precision.

According to a further preferred embodiment of the present invention, said receiving face of the pivotal sensor plate forms a lowermost portion of a vertical face which rises from a lowermost edge of an inclined bottom face of said grass collection container. With this construction the receiving face of the pivotal sensor plate is placed in opposition to the lowermost region of the grass collection container where the mowed grass will most likely enter. As a result, the receiving face of the pivotal sensor plate can receive a force which accurately corresponds to the weight of the amount of the mowed grass held in the grass collection container, thus further improving the precision in the mowed grass amount detection.

Further and other features and advantages of the invention will become apparent upon reading the following detailed description of the preferred embodiments thereof with reference to the accompanying drawings.

DETAILED DESCRIPTION OF THE PREFERRED EMBODIMENTS

Next a grass mowing machine mounting a mowed grass amount detecting apparatus of the invention will be described with reference to the accompanying drawings.

Figure 1:
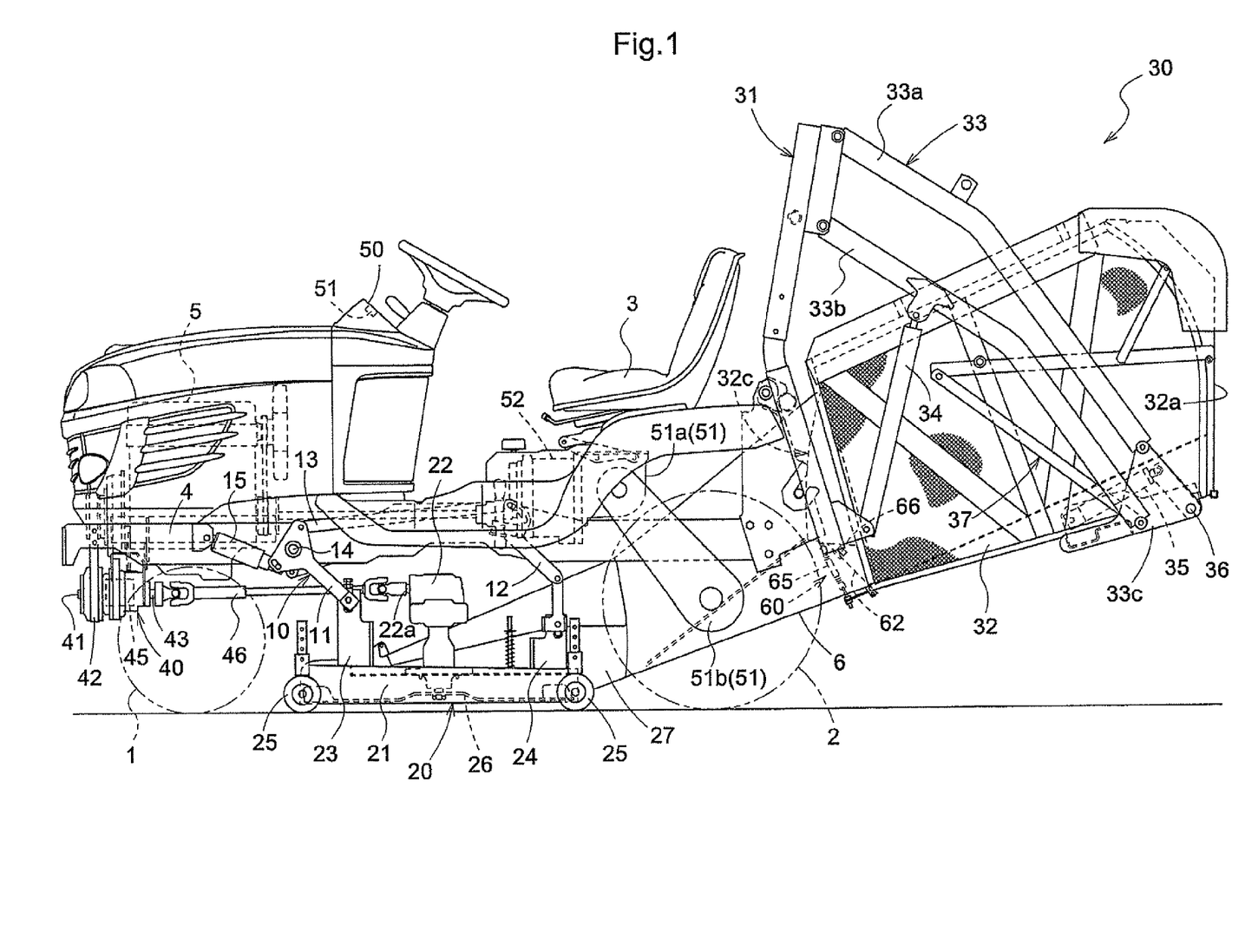
FIG. 1 is an overall side view of a grass mowing machine.

FIG. 1 is an overall side view of the grass mowing machine. As shown therein, is grass mowing machine is a self-propelled type vehicle, including a pair of steerable right and left front wheels 1, 1, a pair of drivable rear wheels 2, 2, a vehicle body frame 4, and a driver's seat 3 mounted on a rear side of the vehicle body frame 4. A front side region of the driver's seat 3 constitutes a driving section. Between the front and rear wheels of the vehicle body frame 4 of this grass mowing machine, there is suspended a mower unit 20 via a link mechanism 10. And, at a rear end of the vehicle body frame 4 of the grass mowing machine, there is attached a mowed grass collecting apparatus 30. This mowed grass collecting apparatus 30 includes a support frame 31 fixed to the vehicle body frame 4, and a grass collection container 32 supported to this support frame 31 to be lifted up/down via the link mechanism.

This grass mowing machine further includes an engine 5 mounted at a front portion of the vehicle body, and a power takeoff ("PTO" hereinafter) mechanism 40 mounted downwardly of the engine 4. The PTO mechanism 40 transmits an engine output which has been transmitted to an input shaft 41 via a transmission belt 42, to a PTO shaft 43 via a hydraulically operable type implement clutch 45. The drive force of this PTO shaft 43 is transmitted via a rotational shaft 46 to a mower blade drive mechanism 22 of the mower unit 20.

The link mechanism 10 includes a pair of right and left front pivot links 11 supported to the vehicle body frame 4 to be lifted up/down, a pair of right and left rear pivot links 12 supported to the vehicle body frame 4 to be lifted up/down, and a pair of right and left connecting links 13. The leading ends of the pair of right and left front pivot links 11 are connected to a front connecting member 23 disposed on the front side of a mower blade housing 21 of the mower unit 20. The leading ends of the pair of right and left rear pivot links 12 are connected to a rear connecting member 24 disposed on the rear side of the mower blade housing 21. The left connecting link 13 operably connects the left front pivot link 11 with the left rear pivot link 12. The right connecting link 13 operably connects the right front pivot link 11 with the right rear pivot link 12. A lift cylinder 15 is connected to one of the paired right and left front pivot links 11.

With the above-described construction of the link mechanism 10 in operation, when the one front pivot link 11 is pivoted by the lift cylinder 15, the pair of right and left front pivot links 11 are pivoted together via a rotational support shaft 14. With this, the mower unit 20 is pivotally lifted up/down relative to the vehicle body frame 4. The mower unit 20 is fixed in position between a lowered operational state where ground-contacting gauge wheels 25 supported to front and rear sides of the mower blade housing 21 and an elevated non-operational state where the respective ground-contacting gauge wheels 25 are lifted up off the ground surface.

When the grass mowing machine travels with the mower unit 20 being under the lowered operational state, in the mower unit 20, two mower blades 26 arranged horizontally side by side inside the mower blade housing 21 are driven by the mower blade driving mechanism 22 to rotate about vertically oriented axes of the mower blade housing, thereby to mow grass. Then, mowed grass is conveyed by an air draft generated in association with the rotation of the mower blades 26 from the mower blade housing 21 toward a mowed grass discharging duct 27 provided upwardly of the mower blade housing 21.

Due to the conveying action of the air draft from the mower blades 26, the mowed grass conveyed past through the mowed grass discharging duct 27 is then conveyed through a conveying duct 6 mounted in the grass mowing machine between the pair of right and left rear wheels 2, 2 and extending along the fore/aft direction of the vehicle body and charged into the grass collection container 32 of the mowed grass collecting apparatus 30. In this way, an amount of the mowed grass discharged into the grass collection container 32 will be sequentially accumulated inside the grass collection container 32.

As shown in FIG. 1, a link mechanism 33 includes a pair of upper and lower lift links 33a, 33b extending rearward relative to the vehicle body from the right and left sides of the support frame 31 to be vertically pivotable, and container supports 33c connected to free ends of the respective lift links 33a, 33b. Via this link mechanism 33, the upper end portion of the support frame 31 is connected to the rear end portion of the grass collection container 32. This mowed grass collecting apparatus 30 includes lift cylinders 34 provided on the opposed lateral sides of the grass collection container 32, and a single damp cylinder 35 provided downwardly of the rear portion of the grass collection container 32.

Figure 2:
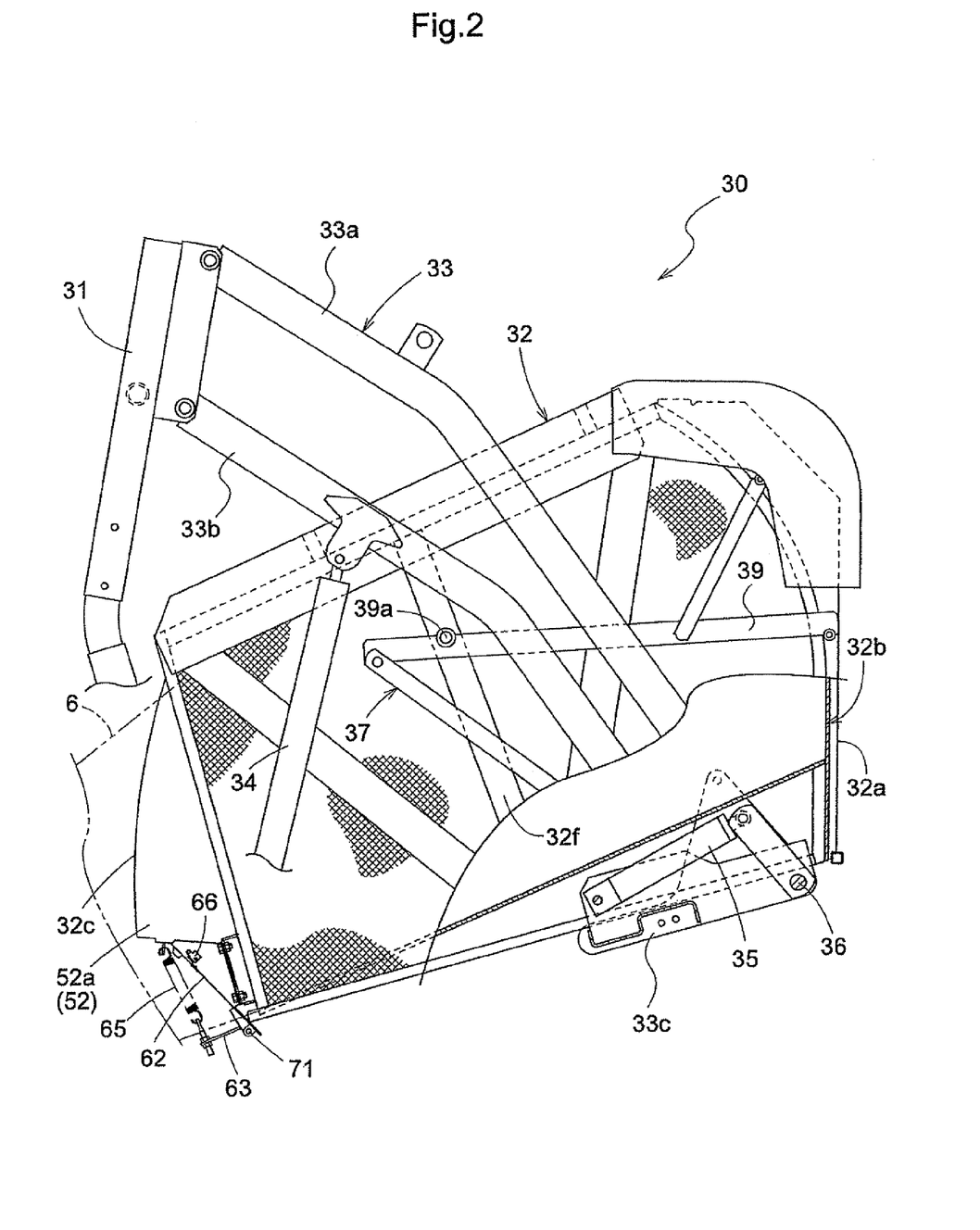
FIG. 2 is a side view showing a grass collection container under its lowered grass collecting state.

FIG. 2 is a side view showing the grass collecting apparatus 30 with the grass collection container 32 being under its lowered grass collecting state. As shown, the lowered grass collecting state of the grass collection container 32 is realized when the pair of right and left lift cylinders 34, 34 move the link mechanism 33 downward and the damp cylinder 35 pivots the grass collection container 32 downward about the axis of a rotational support shaft 36. Under this lowed grass collecting state, a mowed grass charging portion 32c provided at a front portion of the grass collection container 32 is oriented forwardly relative to the vehicle body to be communicated with the exit of the conveying duct 6, so that mowed grass conveyed past the conveying duct 6 is charged through the mowed grass charging portion 32c into the grass collection container 32. At a rear portion of the grass collection container 32, there is provided a mowed grass discharging portion 32b, with a lid 32a. A support arm 39 for this lid 32a is pivoted to its closing side about an axis of a connecting pin 39a connecting this support arm 39 to a container frame 32f, by means of an opening/closing link 37 connected to the support arm 39 and to the container support 33c. As the lid 32a now closes the mowed grass discharging portion 32b, the conveying air introduced into the grass collection container 32 together with mowed grass will flow to the outside of the container through meshing provided in a wall member of the grass collection container 32, whereas the mowed grass will be accumulated within the grass collection container 32.

Figure 3:
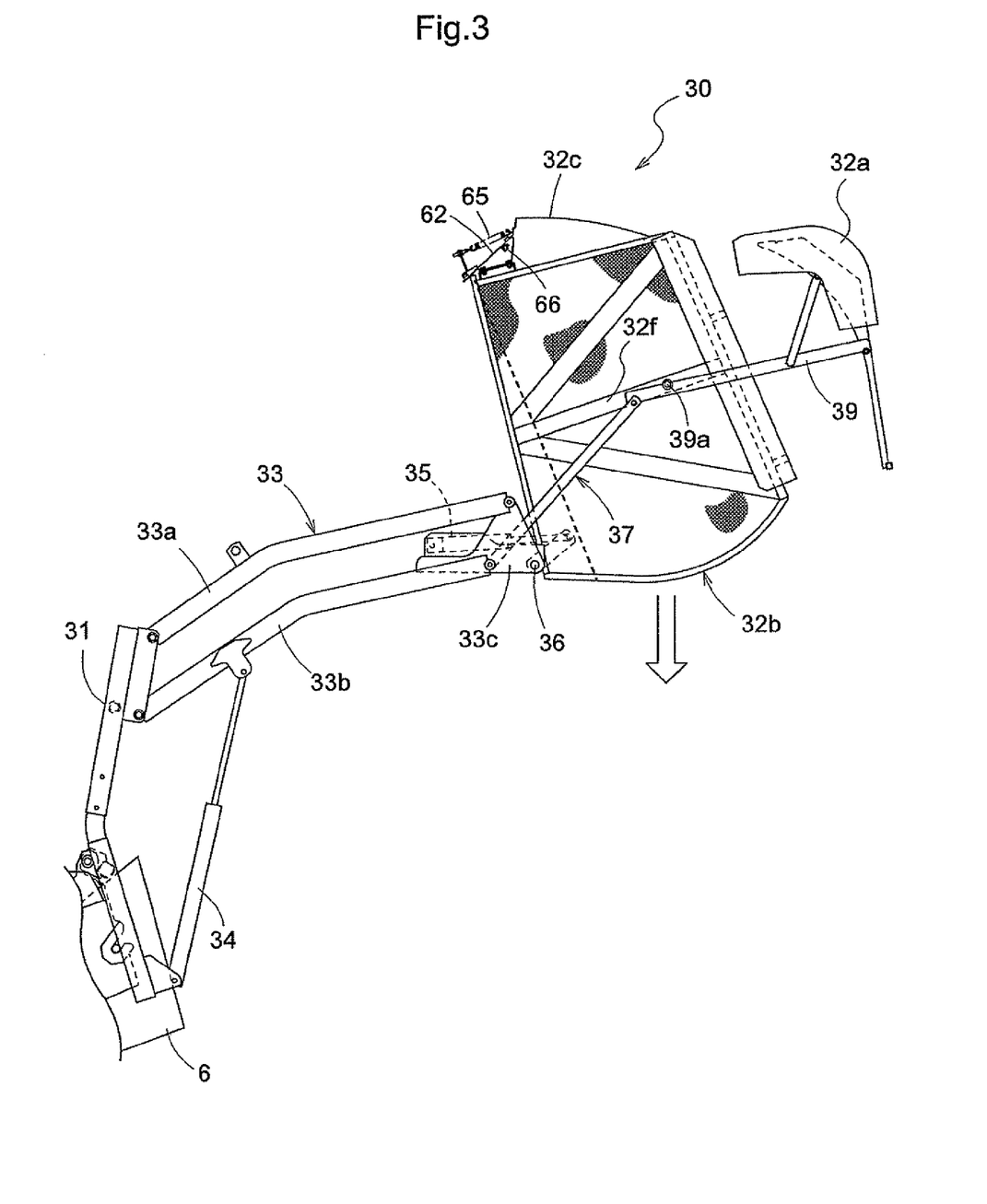
FIG. 3 is a side view showing the grass collection container under its elevated discharging state.

FIG. 3 is a side view of the grass collecting apparatus 30, with the grass collection container being 32 under its elevated discharging state. As shown, his elevated discharging state is realized when the pair of right and left lift cylinders 34, 34 move the link mechanism 33 upward and the damp cylinder 35 pivotally elevates the grass collection container 32 about the axis of the rotational support shaft 36. Under this elevated discharging state, the aperture of the mowed grass charging portion 32c of the grass collection container 32 is oriented upward relative to the vehicle body, whereas the mowed grass discharging portion 32b is oriented downward relative to the vehicle body. When the opening/closing link 37 is pivoted about the rotational support shaft 36 of the grass collection container 32 to pivot the support arm 39 to its opening side, the lid 32a is detached from the mowed grass discharging portion 32b, thus opening up this mowed grass discharging portion 32b. With this, the mowed grass which has been held inside the grass collection container 32 will be discharged through the mowed grass discharging portion 32b due to the free fall effect.

A fullness alarm device 51 is provided in an operation panel 50 of the grass mowing machine. A mowed grass amount detecting apparatus 60 relating to the present invention is disposed at a front portion of the grass collection container 32. Then, if the detecting apparatus 60 detects fullness (full state) of the grass collection container 32, the fullness alarm device 51 alarms fullness information based upon this detection. For instance, the fullness alarming device 51 can cause an alarm lamp to illuminate, upon detection of the fineness of the grass collection container 32.

Figure 4:
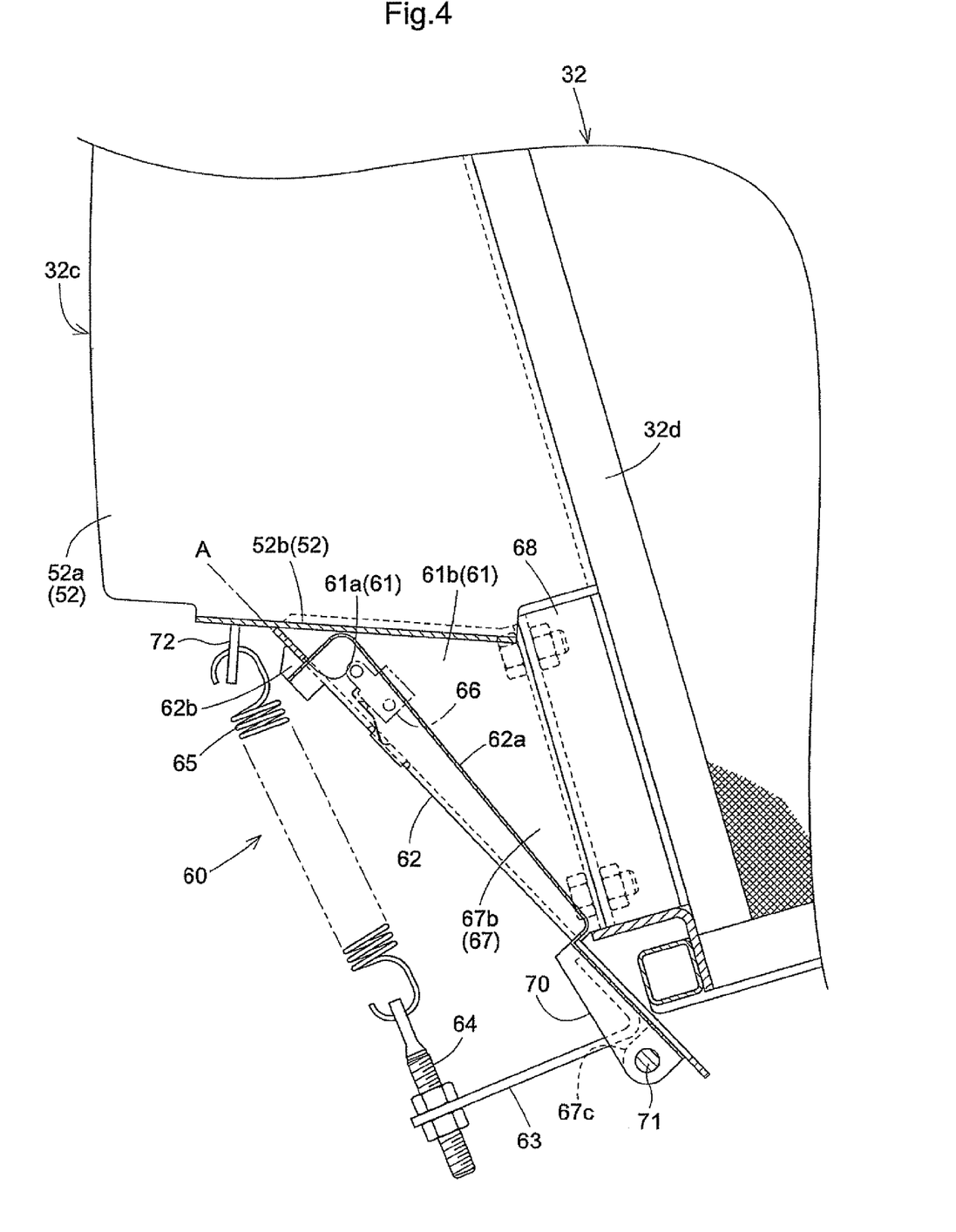
FIG. 4 is a side view in vertical section showing a portion of the grass collection container where a mowed grass amount detecting apparatus is disposed.
Figure 5:
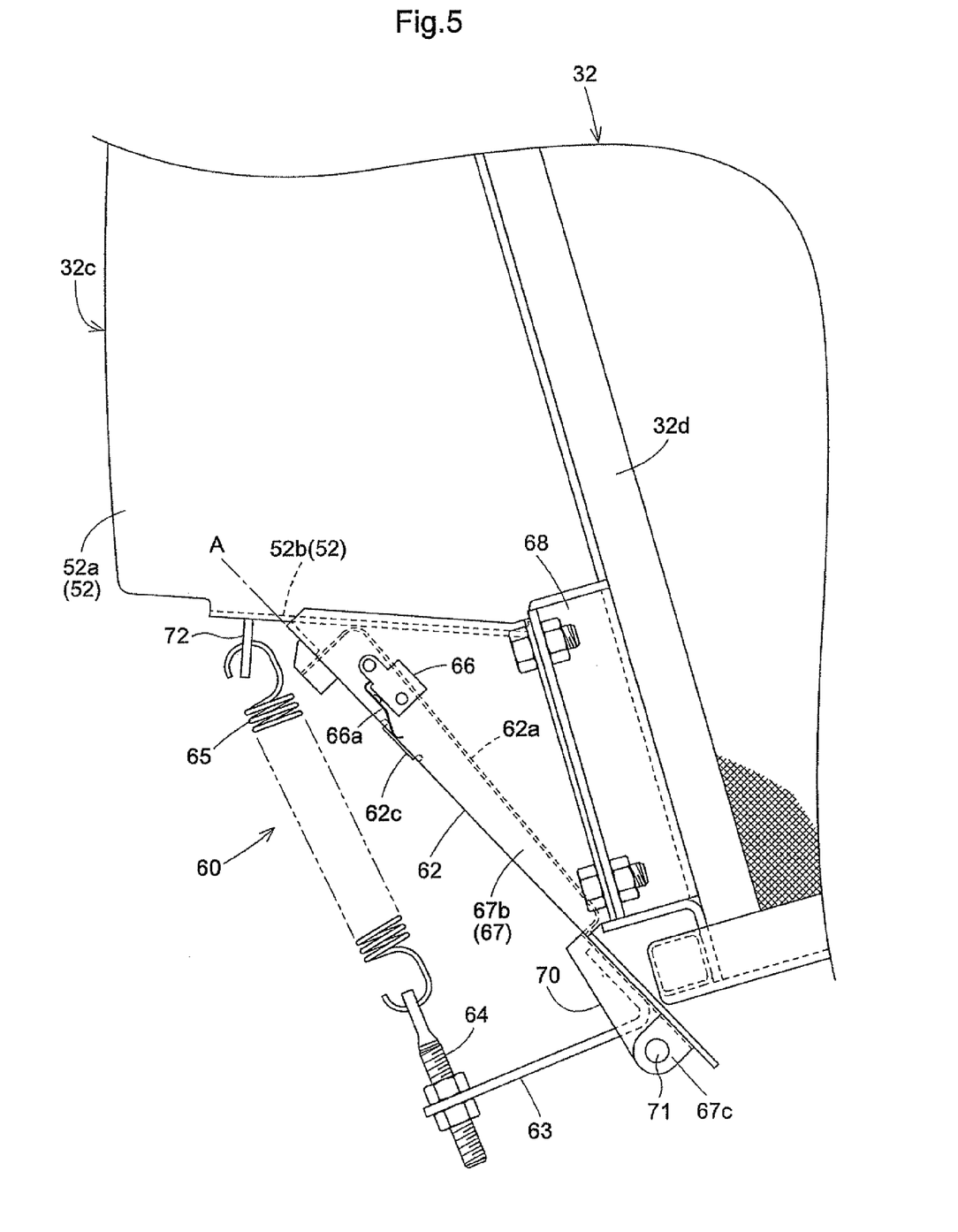
FIG. 5 is a side view showing the mowed grass amount detecting apparatus under its non-detecting state.
Figure 6:
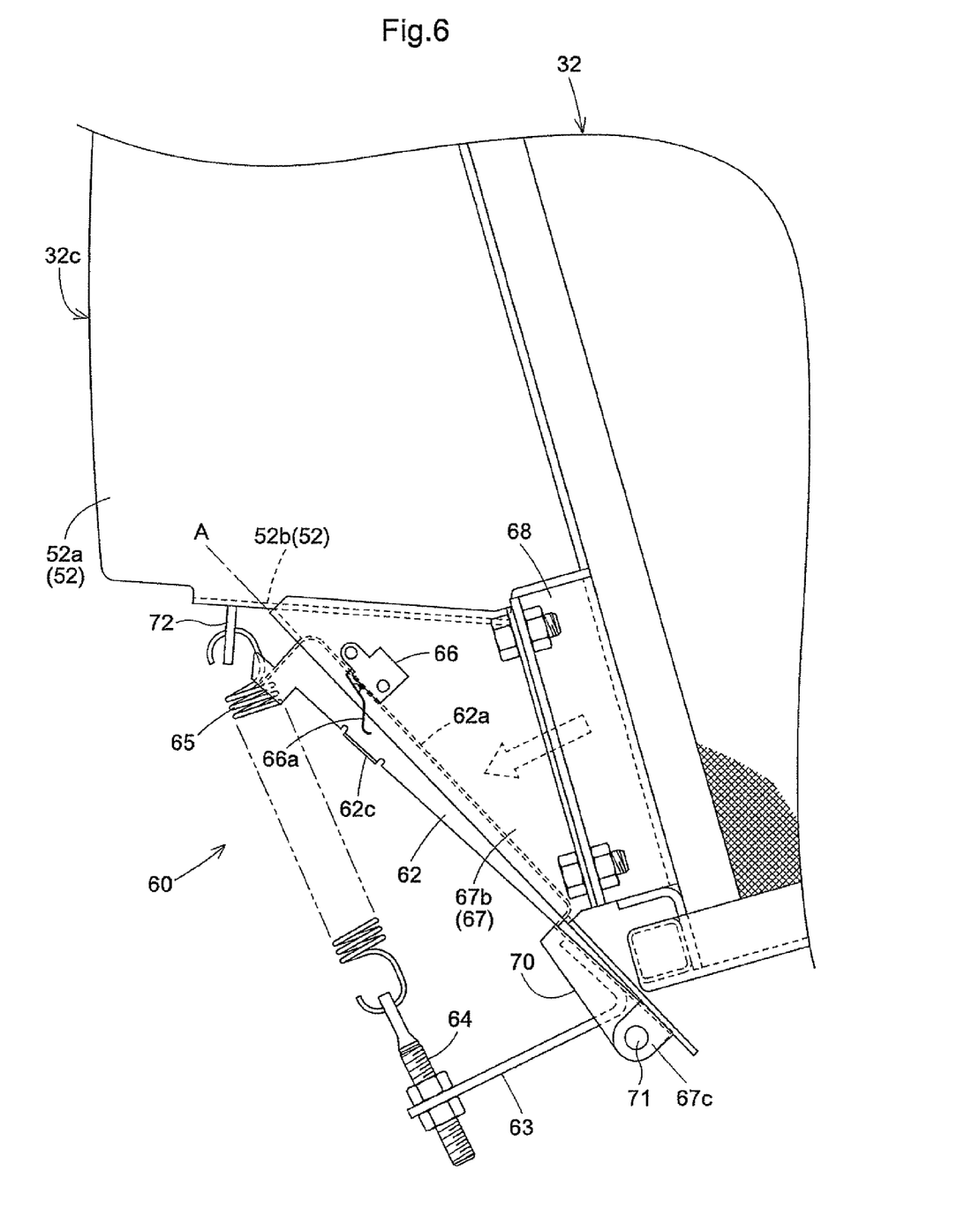
FIG. 6 is a side view showing the mowed grass amount detecting apparatus under its fullness detecting state.
Figure 7:
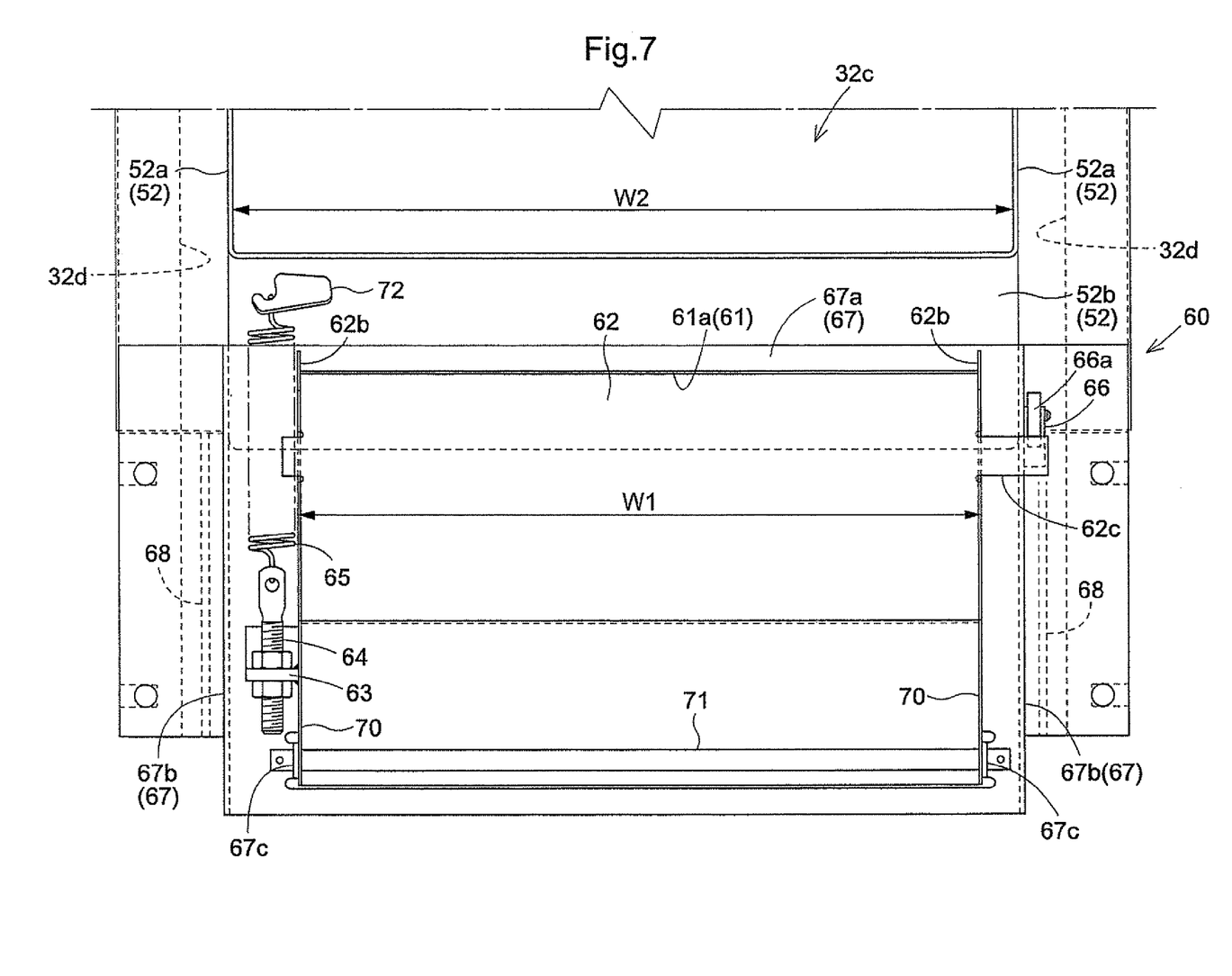
FIG. 7 is a front view of the portion of the grass collection container where the mowed grass amount detecting apparatus is disposed.
Figure 8:
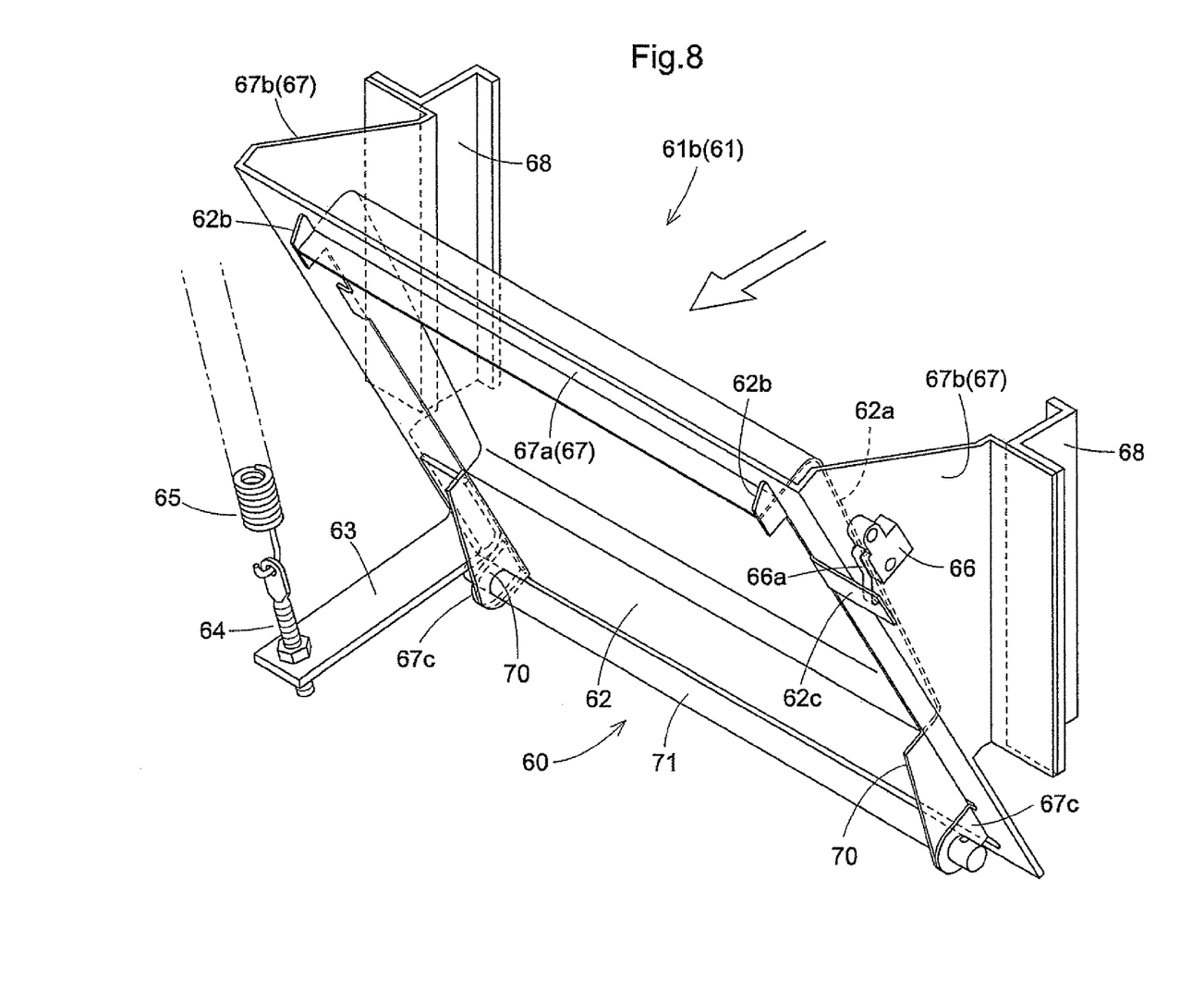
FIG. 8 is a perspective view of the mowed grass amount detecting apparatus.

FIG. 4, FIG. 5 and FIG. 6 are side views in vertical section each showing the particular portion of the grass collection container 32 where the mowed grass amount detecting apparatus 60 is provided. FIG. 7 is a front view of this portion of the grass collection container 32 where the mowed grass amount detecting apparatus 60 is provided. FIG. 8 is a perspective view of the mowed grass amount detecting apparatus 60. As shown in these figures, the mowed grass charging portion 32c of the grass collection container 32 is formed with a pair of right and left lateral plate portions 52a, 52a of a metal plate which are attached to and across a pair of right and left front container frames 32d and with a bottom plate portion 52b of the metal plate 52, to define, on its inner side, an opening communicated with the conveying duct 6.

The mowed grass amount detecting apparatus 60 includes a sensor opening portion 61 provided at the front portion of the grass collection container 32 and downwardly of the mowed grass charging portion 32c, a sensor plate 62 disposed at the outermost region of the sensor opening portion 61, a spring 65 having one end thereof connected via an adjustment screw-like connecting member 64 to a spring connecting arm 63 provided at the lower end of one lateral end side of the sensor plate 63, and a detecting unit 66 supported to one of a pair of right and left lateral plate portions 67b, 67b of a bent metal plate 67.

The bent metal plate 67 is provided as a frame structure consisting of the pair of right and left lateral plate portions 67b, and a front plate portion 67a acting as a crossbar extending continuously from front ends of these lateral plate portions 67b, the structure being fitted under The metal plate 52. This bent metal plate 67 is attached to the grass collection container 32 via connecting members 68 which connect, on the right and left sides of the plate 67, the lateral plate portions 67b with the front container frame 32d. The bent metal plate 67 configured as the above-described frame structure defines an inner space with a rectangular cross section, which space functions as the sensor opening portion 61 described above. The outer (conveying duct side) opening end of this inner space defined by the bent metal plate 67 serves as a sensor disposing region 61a of the sensor opening portion 61 and the remaining inner space serves as a mowed grass entering region 61b of the sensor opening portion 61.

As may be understood from FIG. 2, the mowed grass amount detecting apparatus 60 is disposed in opposition to the front end of the forwardly downwardly inclined grass collection container 32, i.e. to the lowermost portion of this grass collection container 32. That is to say, the sensor plate 62 forms the lowermost face portion of a vertical face defined by the front container frame 32d which rises from the lowermost edge of the inclined bottom face of the grass collection container 32. With is, the sensor plate 62 is capable of reliably receiving mowed grass contained in the grass collection container 32.

A width "W1" of the sensor opening portion 61 along the lateral direction of the grass collection container (i.e. the lateral direction of the grass mowing machine) is set to be similar to an opening width "W2" of the grass charging portion 32c along the lateral direction of the grass collection container 32. Into this sensor opening portion 61, there is protruded a receiving face 62a of the sensor plate 62 which face 62a protrudes on the inner side of the plate 62 (inner side of the grass collection container) to act as a pressure sensing face to be subjected to the weight of the mowed grass. With this, the receiving face 62a of the sensor plate 62 is placed into contact with the mowed grass inside the grass collection container so that the weight of this mowed grass held within the grass collection container 32 maybe applied to the sensor plate 62. In the above, the width "W1" of the sensor opening portion 61 along the lateral direction of the grass collection container can be set equal to the opening width "W2" of the mowed grass charging portion 32c. In this case too, like the above-described case wherein the width "W1" of the sensor opening portion 61 is similar to the opening width "W2" along the lateral direction of the grass collection container, the sensor plate 62 can have an increased area for coring into contact with the mowed grass, so that the sensor plate 62 can receive the weight of the mowed grass with high precision.

The sensor plate 62 is supported to the pair of right and left supports 67c via a support shaft 71 attached to and between a pair of right and left connecting plate portions 70 provided at the lower ends of this sensor plate 62 and a pair of right and left supports portions 67c provided at the lower ends of the bent metal plate 67, so that the sensor plate 62 is pivotable about a horizontal axis of the pivot shaft 71.

The other end of the spring 65 opposite from the end connected to the spring connecting arm 63 is connected to a spring hook 72 provided at the bottom plate portion 52b of the metal plate 52. As the spring 65 pivotally and upwardly urges the spring connecting arm 63 about the axis of the pivot shaft 71, using the spring hook 72 as the reaction providing member, the sensor plate 62 is pivotally urged toward its home position "A" where a pair of right and left positioning pieces 62b, 62b disposed at the upper end portions of the sensor plate 62 are received and supported through their contact with a front plate portion 67a of the bent metal plate 67.

When the amount of mowed grass in the grass collection container 32 reaches a set fullness amount, the spring 65 is expanded by the weight of the mowed grass effective thereto via the sensor plate 62 to allow a pivotal movement of the sensor plate 62 from the home position "A" to the outer side of the grass collection container, thereby to set the pivot angle of the sensor plate 62 from the home position "A" to a predetermined fullness pivot angle.

The detecting unit 66 is comprised of a detecting switch such as a limit switch, a lead switch or the like, which is secured to the lateral plate portion 67b of the bent metal plate 67.

FIG. 5 is a side view showing the mowed grass amount detecting apparatus 60 under its non-detecting state. FIG. 6 is a side view showing the mowed grass amount detecting apparatus 60 under its fullness detecting state. As shown in these figures, the detecting switch 66 has an operational piece 66a, and when the sensor plate 62 is located at the home position "A", the operational piece 66a is under its OFF state as being depressed by a switch operating portion 62c provided in the sensor plate 62. When the pivot angle of the sensor plate 62 from the home position "A" becomes the set fullness pivot angle, the depressing operation by the switch operating portion 62c is released, so that the operational piece 66a is switched over, by its own resilience, to the ON state.

Whether the sensor plate 62 is located at the home position "A" or the sensor plate 62 is pivoted to the set fullness pivot angle, the receiving face 62a of the sensor plate 62 is maintained under the posture with its receiving face 62a advancing into the mowed grass entering region 61b of the sensor opening portion 61, so that no gap which allows leak of mowed grass is formed between the sensor disposing region 61a of the sensor opening portion 61 and the sensor plate 62.

That is to say, when mowed grass is charged into the grass collection container 32, this mowed grass charged in the container contacts the receiving face 62a of the sensor plate 62 through the sensor opening portion 61, so that the weight of the mowed grass is applied to the sensor plate 62. This causes the sensor plate 62 to be pivoted away from the home position "A" against the spring 65. And, the greater the amount of mowed grass held in the container 32, the greater the weight of the mowed grass, hence, the greater the pivot angle of the sensor plate 62 from the home position "A". Until the pivot angle of the sensor plate 62 from the home position reaches the set fullness pivot angle, the detecting unit 69 remains under its OFF state. Upon reaching the set fullness pivot angle by the pivot angle of the sensor plate 62 from the home position "A", the detecting unit 62 is switched over to the ON state. In response to this, the mowed grass amount detecting apparatus 60 detects the pivot angle of the sensor plate 62 from the home position "A" as an amount of the mowed grass held inside the grass collection container 32. As the pivot angle of the sensor plate 62 reaches the set fullness pivot angle, it is detected that the amount of the mowed grass held inside the grass collection container 32 has reached the fullness amount and this detection result is outputted as an electric signal from the detecting unit 66.

Other Embodiments (1) In the foregoing embodiment the outer opening end (conveying duct side) of the inner space formed by the bent metal plate 67 is used as the sensor disposing region 61a of the sensor opening portion 61, and the sensor plate 62 is disposed in this sensor disposing region 61a. However, the sensor disposing region 61a can be provided at any desired position of the sensor opening portion 61.

(2) The detecting unit 66 can be any other switch than the ON/OFF type switch such as the limit switch, but can instead be a switch adapted for detecting the pivot angle of the sensor plate 66 in a continuous manner, so as to continuously detect the amount of mowed grass held within the grass collection container 32.

The invention claimed is:

1. A mowed grass amount detecting apparatus in a grass collection container of a grass mowing machine, the grass collection container receiving grass mowed by a mower unit through a conveying duct, the apparatus comprising:
   a frame structure attached to the grass collection container downwardly from a mowed grass charging portion of said grass collection container communicated and connected with the conveying duct, the frame structure defining an inner space with an outer opening end serving as a sensor disposing region of a sensor opening portion and a remaining portion of the inner space serving as a mowed grass entering region of the sensor opening portion;
   a pivotal sensor plate attached at a bottom portion thereof to a pair of right and left support portions provided at a bottom end of the frame structure, the pivotal sensor plate constituting a portion of a boundary wall for holding the mowed grass charged into the grass collection container, the pivotal sensor plate having a receiving face that is configured to close the sensor opening portion and which receives the weight of mowed grass;
   a spring disposed in a space on an outer side of the receiving face for urging said sensor plate in a direction toward a home-position; and
   a detecting unit for detecting an amount of pivotal movement of said sensor plate from said home-position;
   wherein said receiving face of the pivotal sensor plate receives the weight of mowed grass held within the grass collection container through said sensor opening portion such that the pivotal sensor plate changes in position relative to the detecting unit.

2. The mowed grass amount detecting apparatus according to claim 1, wherein the lateral width of said sensor opening portion is substantially equal to the lateral width of the exit of said conveying duct at the mowed grass charging portion.

3. The mowed grass amount detecting apparatus according to claim 1, wherein said receiving face of the pivotal sensor plate forms a lowermost portion of a vertical face which rises from a lowermost edge of an inclined bottom face of said grass collection container.

* * * * *

UNITED STATES PATENT AND TRADEMARK OFFICE
CERTIFICATE OF CORRECTION

| | | |
|---|---|---|
| PATENT NO. | : 8,006,473 B2 | Page 1 of 1 |
| APPLICATION NO. | : 12/372968 | |
| DATED | : August 30, 2011 | |
| INVENTOR(S) | : Takashi Kuramoto | |

It is certified that error appears in the above-identified patent and that said Letters Patent is hereby corrected as shown below:

Title Page, Item (57) Abstract, Line 2, after "grass mowing" insert -- machine --

Signed and Sealed this
Twenty-second Day of November, 2011

David J. Kappos
*Director of the United States Patent and Trademark Office*